United States Patent [19]

Grenier

[11] Patent Number: 5,651,265

[45] Date of Patent: Jul. 29, 1997

[54] GROUND SOURCE HEAT PUMP SYSTEM

[76] Inventor: Michel A. Grenier, 53 H Sumac Street, Gloucester, Ontario, Canada, K1J 7T7

[21] Appl. No.: 499,578

[22] Filed: Jul. 7, 1995

[30] Foreign Application Priority Data

Jul. 15, 1994 [CA] Canada ................... 2128178

[51] Int. Cl.$^6$ ................................................ F25D 23/12
[52] U.S. Cl. ..................... 62/260; 62/324.6; 165/45
[58] Field of Search ........................ 62/260, 159, 160, 62/324.1, 324.6, 524, 525; 165/45

[56] References Cited

U.S. PATENT DOCUMENTS

| | | | |
|---|---|---|---|
| 3,552,140 | 1/1971 | Palmer | 62/344.6 |
| 3,938,349 | 2/1976 | Ueno | 62/192 |
| 5,038,580 | 8/1991 | Hart | 62/324.6 |
| 5,136,855 | 8/1992 | Lenarduzzi | 62/129 |
| 5,313,804 | 5/1994 | Kaye | 62/160 |
| 5,372,016 | 12/1994 | Rawlings | 62/260 |
| 5,461,876 | 10/1995 | Dressler | 62/160 |

*Primary Examiner*—William Doerrler
*Attorney, Agent, or Firm*—Stanley E. Johnson

[57] ABSTRACT

A ground source heat pump system including an indoor fan coil, a high torque compressor, a thermostatic expansion valve (TXV), a suction gas distributor, an accumulator with an internal heat exchanger and an arrangement of check valves to permit a single direction of refrigerant flow in both the heating and cooling modes. Only one TX valve is required providing simplicity for the system. A backflooding control valve is used in the system to control condenser pressures to assure proper refrigerant quantity and pressure at the TX valve. The heat pump also uses a head pressure control valve to maintain a pre-set refrigerant pressure in the ground coil on air conditioning mode. The system charge is the same for heating and cooling and the ground coil consists of a plurality of three pipe units—one pipe for inflow and two for out flow.

35 Claims, 6 Drawing Sheets

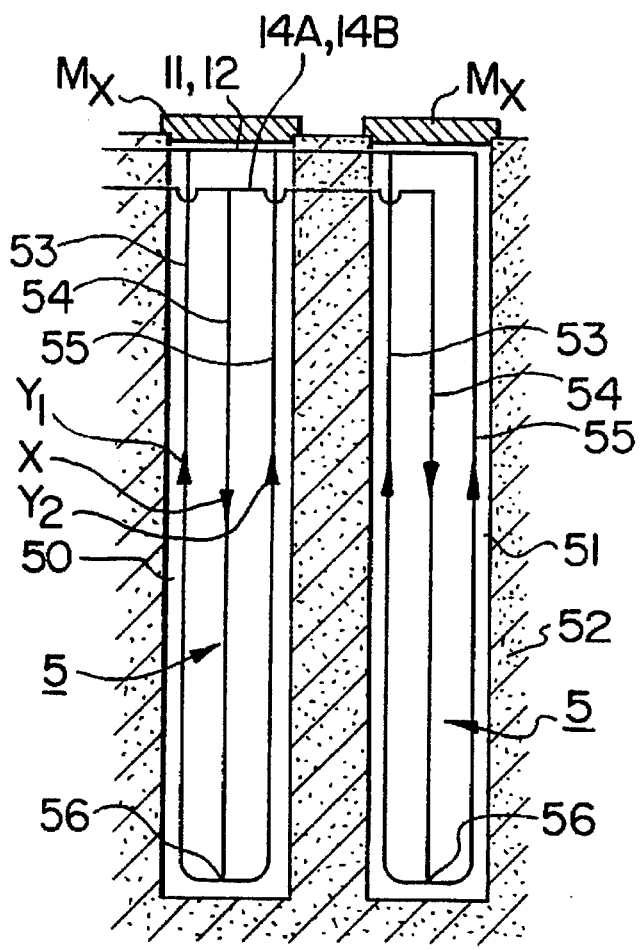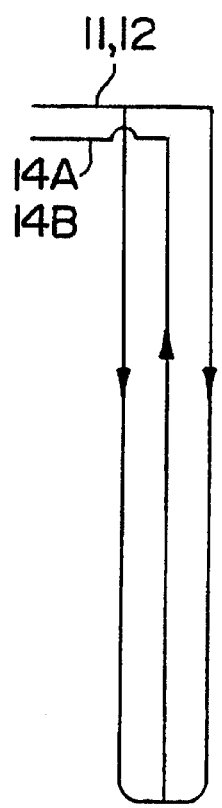
FIG. 3  FIG. 4
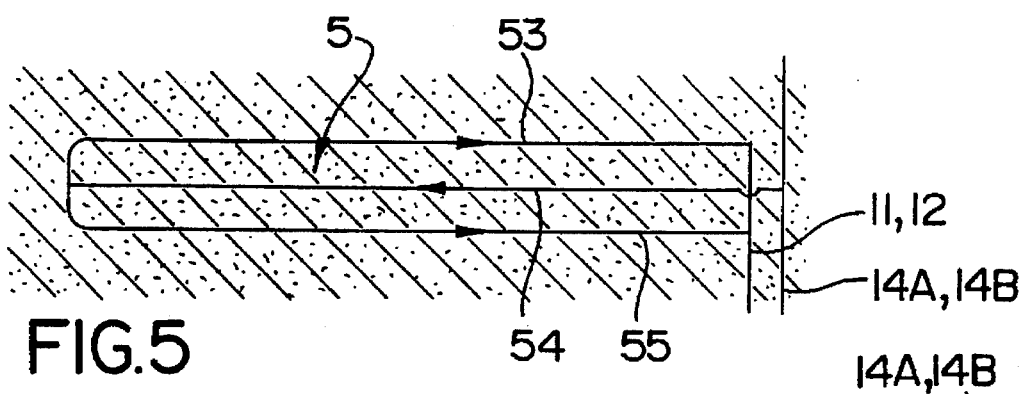
FIG. 5
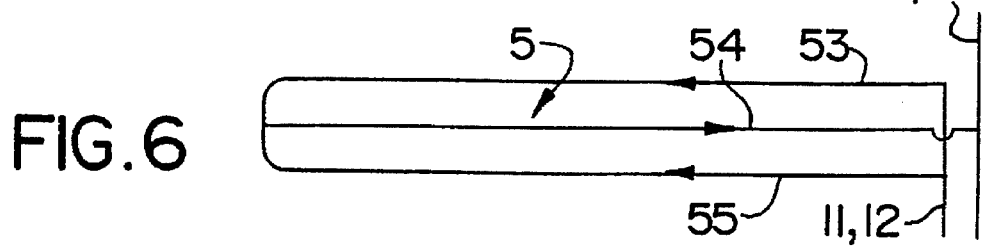
FIG. 6

GROUND SOURCE HEAT PUMP SYSTEM

FIELD OF THE INVENTION

The present invention relates to heat pumps and more particularly to improvements to a ground source heat pump. The invention includes means to control the flow of the refrigerant, maintain control in either heating or cooling mode, and control the system pressure in either mode. The present system uses methods and apparatus to control the quantity of refrigerant to a minimum utilizing essentially the same amount for the heating and the cooling mode but especially in cooling mode, creating a safer product for both the environment and the consumer.

BACKGROUND OF THE INVENTION

A ground source heat pump is one that uses a below ground coil, (referred to herein as the outdoor coil), with refrigerant therein, to transfer heat to or from the ground. The coil acts as an evaporator and condenser in the overall system design dependent upon the mode of operation, i.e. heating or cooling. The natural heat from the ground can then be used to either heat or cool an enclosed space such as a residence, commercial building or the like. The native earth is a heat source in the heating mode and a heat sink in the cooling mode. The heat pump also has an indoor unit that is connected to the outdoor coil and controls the heating and cooling operations.

There have been attempts over the years to perfect this technology by addressing some faults to the system that affect performance. One problem with existing systems is known as "hunting" which makes it impossible to maintain a constant and consistently high coefficient of performance (COP) level. "Hunting" is an uncontrolled underfeed/overfeed by the thermostatic expansion valve (TXV) (metering device) of the system that results in very wide and severe pressure fluctuations on the heating mode where the ground collector coil is an evaporator. With wide evaporator fluctuations it is impossible to maintain constant the Coefficient of Performance (COP) and drastically reduces the heat the heat pump can produce in the heating mode.

In the cooling mode, after a heating season is over and the heat pump is switched to the cooling mode, the ground collecting coil becomes a condenser rejecting heat from the heat pump. Because the ground is frozen the refrigerant liquifies in the ground coil at to low a pressure and temperature, e.g. 20° F. & 50 to 60 PSIG. This causes a lack of flow or severely reduced flow back out of the ground coil to supply the thermal expansion (TX) valve with the proper amount and pressure of refrigerant. This lack of flow will prevent the heat pump from operating properly in the cooling mode. To counteract this problem most heat pump systems have twice as much refrigerant charge for the cooling mode as for the heating mode. This method has offered a very limited success but increases the refrigerant charge.

A large quantity of refrigerant, in the event of a leak, is dangerous because a popular refrigerant R-22 is heavier than air and displaces air. This could cause suffocation of occupants of the space subject to air conditioning. Limited control of the refrigerant gases in most systems on the market, especially in the cooling mode that requires double the refrigerant charge, poses threats to the environment and people should there be a leak. Some known designs require 80 pounds or more gas refrigerant.

Improperly designed outside copper coils in both the design of and size of and, in vertical installations particularly, the length of has been a source of problems with existing systems. Undersized ground coils have been used to minimize the refrigerant charge.

Excessive refrigerant levels for many reasons that are due to poor design of the refrigerant controls in the system, and poorly designed ground coils have also been a problem associated with existing systems.

Inadequate return of the refrigerant gases and refrigerant oil to the system is another problem of existing systems which causes poor COP's, and erratic behaviour in system performance as well as early equipment failure, particularly failure of the compressor.

U.S. Pat. No. 5,136,855 issued Aug. 11, 1992 concerns a ground source heat pump. In the patented system there is an accumulator with refrigerant level sensor. The system includes an indoor coil circuit with an indoor coil and an outdoor coil circuit with an outdoor coil and a scroll compressor. The accumulator is used for separating gaseous refrigerant from liquid refrigerant. A level switch, which when the heat pump is in the cooling mode, controls a solenoid valve connected in parallel to a thermal expansion valve to change a base refrigerant flow to the indoor coil when the refrigerant level in the accumulator drops below or rises above a preset level. The control means is intended to increase efficiency but even with that it is believed the system in the heating mode has a COP of about 2.5. In the heating mode most systems operate at a COP of about 4 or slightly above. U.S. Pat. No. 5,038,580 issued Aug. 13, 1991 to David P. Hart is also directed to a ground source heat pump system. The patentee indicates that a coefficient of performance (COP) of 3 is easily obtained for a heat pump using a direct earth coupled underground heat exchanger. The patentee indicates at column 2, lines 43 to 45 that "Approximately twice the quantity of refrigerant charge is required in the cooling cycle as compared to the heating cycle". The unit is sized to meet cooling requirements but in order to operate properly during the heating season a portion of the refrigerant charge is stored. The exchanger tubes in the earth vary in diameter from one end to the other with the smaller diameter being at the bottom and the larger diameter at the top. In the cooling mode, as the refrigerant expands from liquid to vapour in flowing upwardly the exchanger tube diameter increases to maintain appropriate velocities for optimum pressure drop.

An object of the present invention is to provide a heat pump which is safe to both the consumer and the environment by reducing the amount of refrigerant from that conventionally used in known systems. The aim is to reduce the refrigerant levels to about half of what most existing systems use particularly in the cooling mode.

A further principal object of the present invention is to provide a ground source heat pump in which approximately the same quantity of refrigerant gas is used in each of the cooling and heating modes.

A further principal object of the present invention is to provide a ground source heat pump system that has a coefficient of performance of approximately four in the heating mode and in the cooling mode, an energy efficiency rating (EER) of about 12.

A further principal object of the present invention is to minimize or reduce the "hunting" as this has a negative effect on the COP.

A further principal object of the present invention is to provide a ground source heat pump system in which the refrigerant gases are under control to thereby render predictable performance.

A further principal object of the present invention is to provide an improved piping system for the ground coil.

A further principal object of the present invention is to provide a piping system for the ground coils in which portions are blocked off until predetermined, preselected conditions are met.

SUMMARY OF THE INVENTION

In keeping with the foregoing there is provided in accordance with one aspect of the present invention a ground source heat pump wherein the subsurface heat exchanger comprises a plurality of pipes in parallel flow relation and wherein, in a cooling mode operation of the system, means is provided preventing refrigerant flow to a selected number of such pipes until such time as the refrigerant flowing to said selected number has reached a predetermined condition. In the preferred form the selected number of pipes is approximately two thirds (⅔) of the total and the predetermined condition is a pressure in the range of 200 to 275 psig and preferably 225 psig.

In keeping with this aspect of the present invention there is provided in a ground source heat pump system having a refrigerant compressor with high torque starting characteristics, a closed loop refrigerant circuit including a reversing valve, an indoor coil and an outdoor coil the improvement comprising an outdoor coil divided into a first section and at least one further section with said sections being connected in parallel flow relation and including a head pressure control valve means operatively controlling flow of the refrigerant, in the cooling mode, to said at least one further section, said control valve means being normally closed preventing flow of refrigerant to said at least one further section until such time as the refrigerant reaches a predetermined pressure.

There is also provided a direct expansion ground source heat pump system comprising: a compressor having high torque starting characteristics; a reversing valve for switching the system from one to the other of a heating mode and a cooling mode; a ground coil system that includes a first group of a plurality of parallel fluid flow through pipes located in the earth and to which the refrigerant flows to from said compressor when said reversing valve is in its cooling mode position; a second group of a plurality of fluid flow through pipes located in the earth, said second group being in parallel flow with said first group; a head pressure regulator valve preventing flow of refrigerant to said second group until such time as such refrigerant reaches a predetermined pressure; a refrigerant receiver tank; a pressure regulator valve in a return line for refrigerant in the cooling mode operation from the ground coil to said refrigerant receiver tank; a thermal expansion valve; an accumulator tank having a heat exchanger coil therein in a refrigerant flow through line from said receiver tank to said thermal expansion valve; an indoor air flow through heat exchanger coil between said thermal expansion valve and said accumulator tank; and a refrigerant line extending from within said accumulator tank to said compressor, said line within the tank being in heat exchange relation with said heat exchanger coil.

In accordance with another aspect of the present invention each pipe of the ground coil comprises three substantially co-extensive pipes inter-connected so that refrigerant, in mainly a liquid state flows in one direction in one of the three pipes and refrigerant mainly a gaseous state flows in an opposite direction in the other two of said three pipes.

In accordance with a further aspect of the present invention there is provided a direct expansion ground source heat pump system comprising: a compressor having an output side of high pressure gaseous refrigerant and a suction input side, said compressor having high starting torque characteristics; an indoor heat exchanger coil providing an evaporator and condenser respectively in a cooling and heating mode of operation for the system; an outdoor sub-surface heat exchanger coil providing a condenser and evaporator respectively in said cooling and heating mode of operation; a receiver tank for holding a supply of liquid refrigerant including means to return refrigerant thereto from a selected one of said coils dependent upon the selected mode of operation for the system; a reversing valve; an accumulator and means operatively connecting said accumulator to said suction side of the compressor for supplying refrigerant thereto in a gaseous state and to said reversing valve for return of refrigerant from a selected one of said coils dependent upon the selected heating or cooling mode of operation determined by the selected position for said reversing valve; a flow through pressure control valve operatively connected to said receiver tank and return of refrigerant from a selected one of said indoor and outdoor coils dependent upon the selected, heating or cooling, mode of operation; and a thermal expansion valve operatively connected to said receiver tank and selectively to one of said outdoor and indoor coils dependent upon the selected mode of operation with the connection being to a supply side of the outdoor coil in the heating mode of operation and the supply side to said indoor coil in the cooling mode of operation.

BRIEF DESCRIPTION OF THE DRAWINGS

The invention is illustrated by way of example with reference to the accompanying drawings wherein:

FIG. 3 is a schematic in partial vertical section of a vertical ground coil with arrows indicating the direction of refrigerant flow in the heating mode;

FIG. 4 is the same as FIG. 3, in lesser detail, indicating the direction of refrigerant flow in the cooling mode;

FIG. 5 is a top plan view of a single three pipe unit buried horizontally in the earth and showing the direction of fluid flow in the heating mode;

FIG. 6 is the same as FIG. 5 but showing the direction of refrigerant flow in the cooling mode;

DESCRIPTION OF PREFERRED EMBODIMENT

Figure 1:
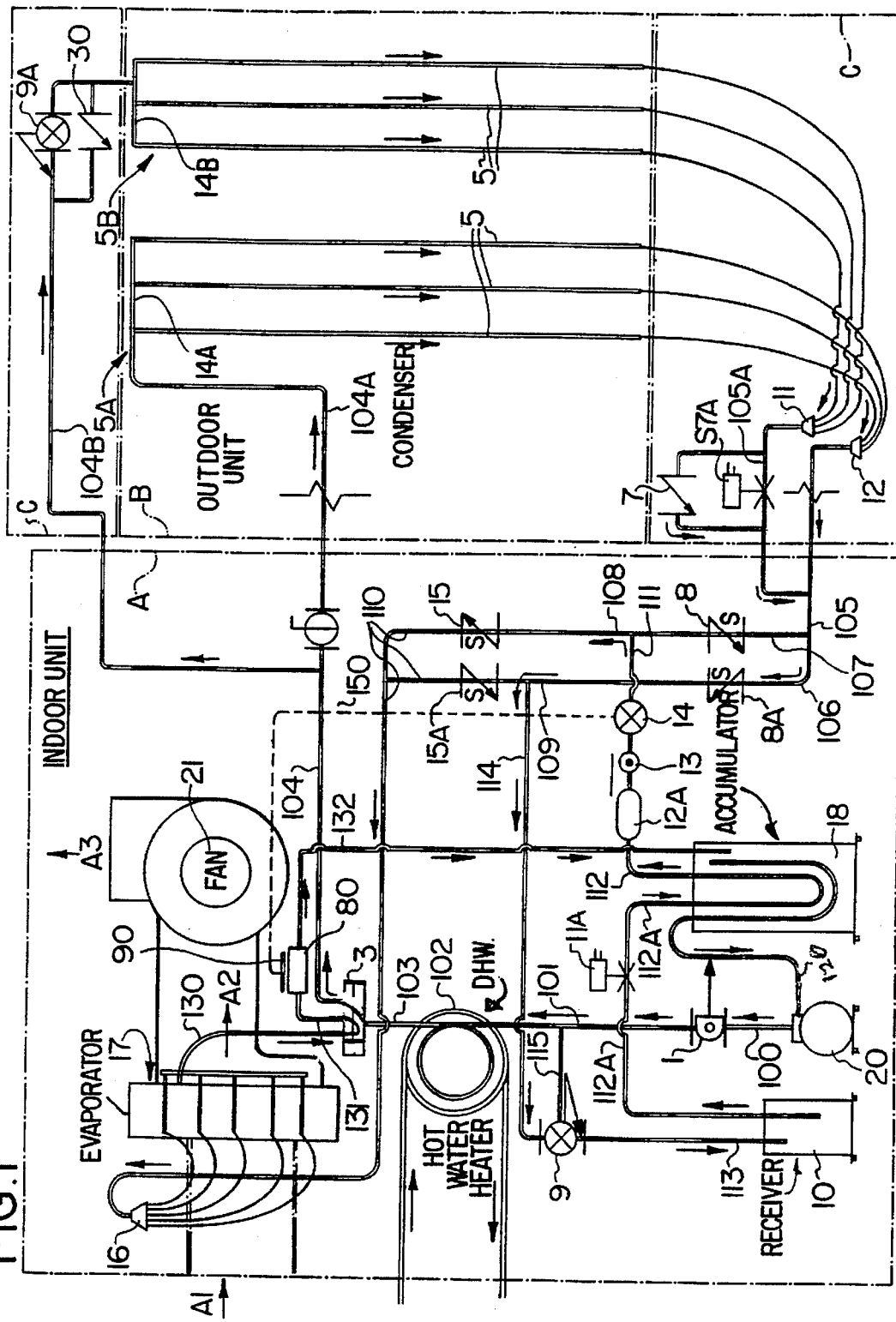
FIG. 1 is a schematic of a ground source heat pump system provided in accordance with the present invention with arrows indicating refrigerant flow in the cooling mode.
Figure 2:
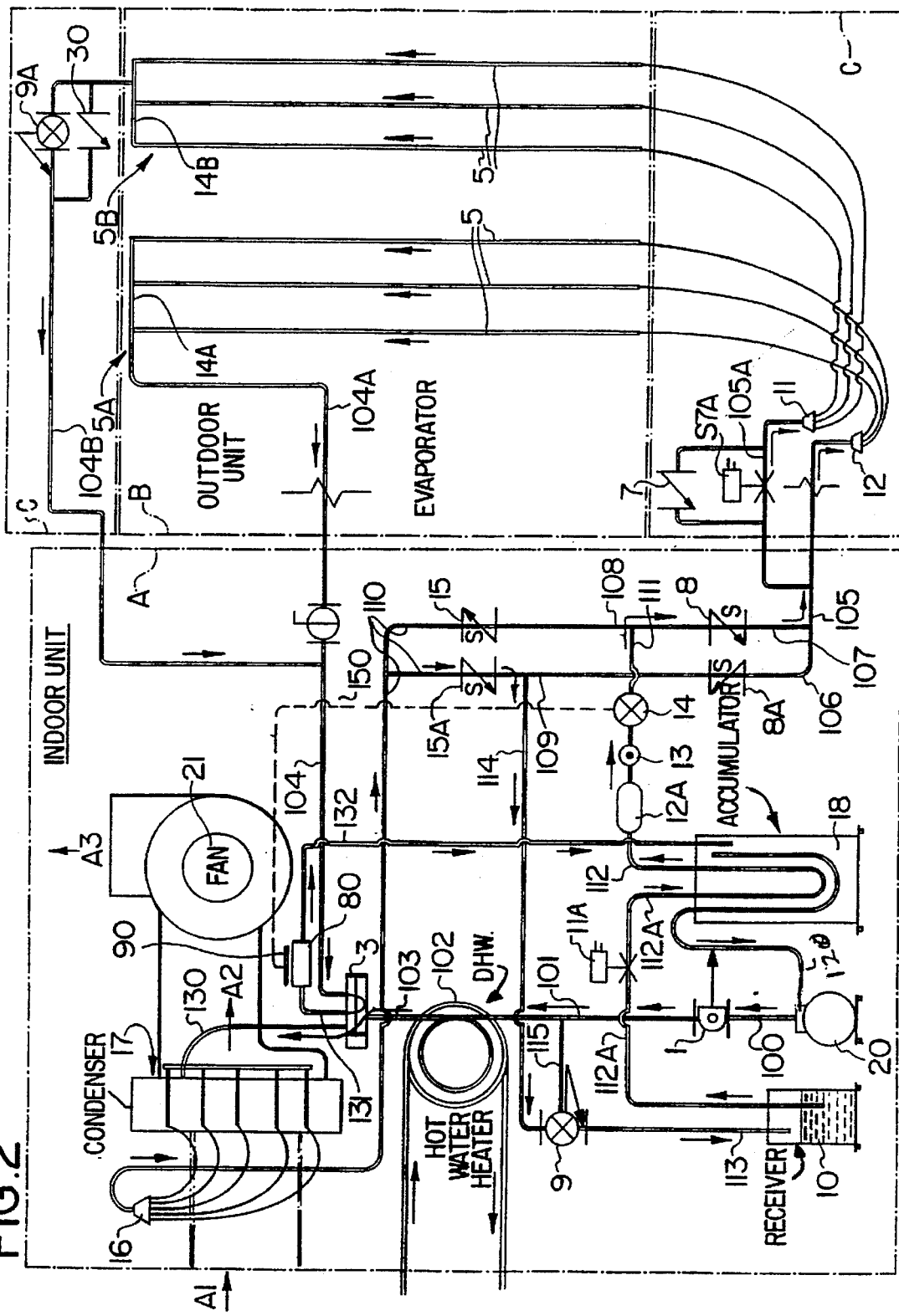
FIG. 2 is a schematic of the same system with arrows indicating refrigerant flow in the heating mode.

Referring to FIGS. 1 and 2 the system includes of an indoor unit A, that includes an indoor coil, and an outdoor unit B that includes an outdoor coil and unit C (shown in two parts) which may be part of the indoor unit or a separate single unit as a connector between units A and B.

Unit A has a scroll compressor 20 (or other compressor with high starting torque capability) connected via refrigerant line 100 to an oil separator 1 which in turn is connected by refrigerant line 101 to a heat exchanger coil 102 of a domestic hot water heating unit DHW. Refrigerant line 103 connects the coil 102 with a reversing valve 3 that is used to select the mode of operation for the system, i.e. heating or cooling as the case may be.

Refrigerant line 104 from the reversing valve 3 has two branches designated respectively 104A and 104B to the outdoor coil of the outdoor unit B. The ground coil comprises a number of copper pipes 5 disposed in bore holes in the earth either vertically or at a slope or they may be buried horizontally. The number of pipes and the length of the pipes 5 will be dependent upon the capacity of the system designed for the installation at hand.

In accordance with one aspect of the present invention the ground pipes 5 are divided for the cooling mode of operation into two or more groups and by way of example two groups are illustrated designated respectively 5A and 5B. Group 5A represents approximately one third of the ground coil piping while group 5B represents the remaining two thirds of the ground coil piping. As will be described more fully hereinafter when the system is in the cooling mode, the refrigerant is prevented from flowing through the ground coil piping group 5B until the refrigerant reaches a preselected pressure of for example 225 PSIG.

In accordance with another aspect of the present invention each pipe 5 comprises a "three pipe" system described in detail hereinafter. Basically there are three co-extensive copper pipes of substantially equal length connected at one end so that there is parallel flow in one direction in two of the three pipes and flow is in the opposite direction in the third pipe. The single flow pipe also preferably is slightly smaller in diameter than the other two, i.e. parallel flow pipes.

The refrigerant line 104A is connected to a header or manifold 14A which connects in parallel conduits 5 of the group 5A. The refrigerant branch line 104B is connected to the manifold 14B by way of a head pressure regulator valve 9A. This valve is adjustable and set for a preselected pressure at which it will open and allow refrigerant to flow into the pipes of group 5B in the cooling mode operation. The manifold header 14B connects in parallel pipes 5 of those in group 5B. In the heating mode refrigerant flows from pipes 5 of group 5B to line 104B via check valve 30 which bypasses the pressure regulator valve 9A.

The ends of the pipes 5 opposite the manifold 14A in the Group 5A are connected by way of distributor 12 to refrigerant line 105 which branches into refrigerant lines 106 and 107.

Conduits 5 at their end opposite from the manifold 14B (in reference to refrigerant flow path) are connected by way of a distributor or header 11 to conduit 105A having a solenoid operated valve S7A therein paralleled by a check valve 7. Liquid refrigerant flows through valve 7 in the cooling mode and prevents flow in the opposite direction. In the heating mode flow is permitted in this opposite direction by energizing solenoid valve S7A. The refrigerant line 105A connects into line 105.

Refrigerant line 107 connects to a check valve 8 and by way of refrigerant line 108 is connected to a check valve 15. Check valve 15 is connected by way of refrigerant line 110 to a distributor or header 16 which in turn is connected to a heat exchanger coil 17 of an air flow through indoor coil.

Refrigerant line 106 connects to check valve 8A and connected to such valve is refrigerant line 109 which in turn connects to a further check valve 15A. Check valve 15A connects to refrigerant line 110.

Refrigerant line 108, by way of refrigerant line 111, connects to (TXV) thermal expansion valve 14 which is connected in series with a sight glass 13, a drier 12A and by way of refrigerant line 112 connects to a heat exchanger coil located in the subcooling accumulator 18. The line 112 continues through from the coil in the accumulator as refrigerant line 112A which connects to a refrigerant receiver 10. An anti-migration solenoid valve 11A is in the refrigerant line 112A.

A refrigerant line 113, from the refrigerant receiver 10, connects to a head pressure control valve 9. Valve 9 is preferably one known in the trade by the designation OROA™ from Sporlan Valve Co. This valve may be used up to a capacity of 20 tons. The valve responds to changes in outlet pressure only and opens with a rise in pressure. The valve is set at 180 PSIG for refrigerant R22, the refrigerant of the present system.

With respect to check valves 8, 8A, 15 and 15A they are flow controllers. Check valve 8, in the heating mode, permits fluid flow from line 108 to 107 and prevents flow in the opposite direction. Valve 15, in the cooling mode, allows flow from line 108 to 110 and prevents flow in the opposite direction and in the heating mode it prevents refrigerant flow from line 108 to 110. Valve 15A allows flow from line 110 to 108 in the heating mode and prevent flow in the opposite direction. Valve 8A allows fluid flow only from line 106 to 109.

A first refrigerant line 114 from valve 9 connects to refrigerant line 109 between check valves 15A and 8A and a second refrigerant line 115, to pressurize receiver 10 when Valve 9 throttles shut, connects to refrigerant line 101 from the compressor.

The air coil 17 has an air inlet passage for the flow of air in the direction of arrow A1 which exits from the air coil as flowing air designated by the arrow A2 and by way of fan unit 21 is driven from an air duct as indicated by arrow A3.

The thermal expansion valve 14 responds to a heat sensor 90 associated with a suction gas distributor and heat equalizer device 80 to be described hereinafter. Signals from sensor 90 are conducted via circuit 150 to the TX valve 14 which responds to the sensed temperature. Refrigerant line 130 connects the coil 17 of the air coil unit with the reversing valve 3. Refrigerant line 131 from reversing valve 3 is connected to one end of unit 80 and the other end of unit 80 is connected via refrigerant line 132 with the accumulator 18. The accumulator is connected to an inlet to the compressor by way of refrigerant line 120 that projects into accumulator 18.

The ground coils of outdoor unit B are preferably in an arrangement as illustrated partially in FIGS. 3 and 4. Referring to FIG. 3 there is illustrated only 2 holes 50 and 51 of many bore holes in the earth 52. Located in each bore hole is a pipe unit 5 comprising three pipes designated 53, 54 and 55. These three pipes are substantially co-extensive and connected at the bottom of the bore hole by way of a T-joint 56. Pipes 53, 54 and 55 are copper tubing and each, for example, may be 50 feet in length. The pipe 54 may be, for example, 5/16th diameter copper tube while the pipes 53 and 55 each may be copper tubes 3/8th inch in diameter.

The ground pipes 54 in each of the bore holes are connected to header 14A or 14B as the case may be dependent upon which group they belong to and the pipes 53 and 55 in each of the bores are connected to distributor 11 or 12 as the case may be as to which group they belong to.

It is to be understood FIG. 3 is representative of the arrangement for both groups 5A and 5B in which the ground pipe arrangement is the same in each of the two groups. As previously indicated group 5A is approximately one third of the total number of ground pipes while group 5B is the remaining two thirds. The ground pipe arrangement is the same for each group and they differ only in their connection to the system by way of the refrigerant lines previously described. As will be seen hereinafter there is parallel flow in two of the pipes in a direction which is opposite the flow of refrigerant in the other, i.e. the third pipe. The refrigerant is normally in a liquid state in the single pipe and in a vapour or gaseous state in the two pipes.

The bore holes 50 and 51 in FIG. 3 represent bore holes in the earth and normally would not exceed more than 50 feet deep in depth. These bore holes may also be at an angle to the vertical. The ground bore holes 50 and 51 for example are 3 inch diameter bore holes drilled 50 feet deep in the earth and/or bed rock after which the vertical copper ground piping is inserted and the bore holes are sealed then at the top with, for example, a mortar mix designated MX in FIG. 3.

Figure 10:
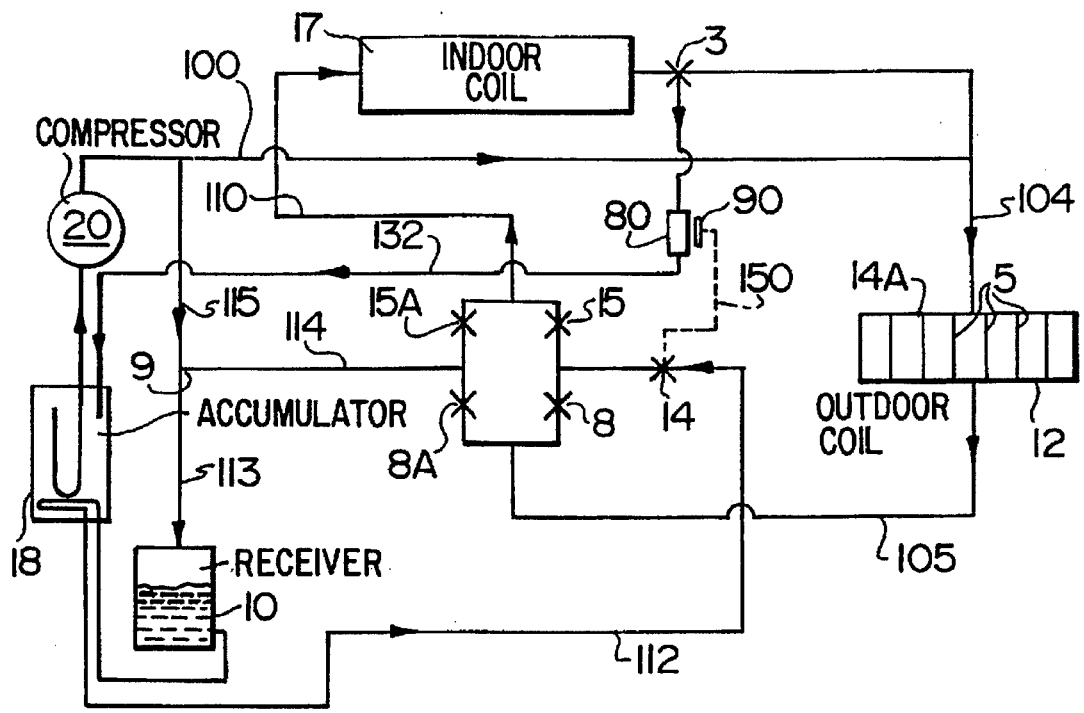
FIG. 10 is a simplified schematic illustrating refrigerant flow in the cooling mode.

FIGS. 1 and 10 are schematics with arrows thereon showing the direction of refrigerant flow with the heat pump system operating in the cooling mode.

Referring to FIG. 1 compressed hot gas, containing a small quantity of oil, exits the compressor 20 via refrigerant line 100 and enters the oil separator 1 which separates and returns the oil phase to the compressor crankcase. The compressed hot gas phase enters the heat exchanger coil 102 of the domestic hot water heating unit DHW where the temperature of the hot gas is slightly reduced. It is a desuperheater for the refrigerant but not a necessary unit. The hot gas, via refrigerant line 103, then enters the reversing valve 3 which diverts it via refrigerant line 104, 104A towards the ground coil section 5A where it condenses losing its latent heat.

The refrigerant flows via refrigerant line 104B to the head pressure regulator 9A and check valve 30 and they stop the flow into the remaining ⅔ of the ground coil piping group 5B until the refrigerant pressure reaches a predetermined pressure. This predetermined pressure is preferably 225 PSIG but operatively could be in the range of about 200 to 275 PSIG. The pressure in the ground condenser coil is high enough to permit efficient refrigerant flow. The refrigerant condenses in the ground coil at a pressure of no less than 180 PSIG which is controlled by the head pressure control valve 9. This valve is designed to maintain a condenser pressure of 180 PSIG by restricting the flow of liquid refrigerant out of the condenser coil in this case ground coils 5. The outlet of this coil is restricted until the refrigerant pressure reaches 180 PSIG and is maintained. As this pressure is achieved valve 9 throttles open and closed to permit some liquid condensed refrigerant out of the condensing coil and at the same time the valve 9 will bypass refrigerant via refrigerant line 115 some hot high pressure gas exiting the compressor 20 to enter the refrigerant receiver 10 via line 113 to maintain its pressure at no less than 180 PSIG.

Liquid refrigerant, from the condenser coils (earth conduits 5), returns through check valves 7 and 8A, refrigerant line 114 through the head pressure control valve 9 and then enters the receiver 10 via line 113 where the refrigerant is stored for the systems use. The solenoid valve S7A is normally closed and energized to open only in the heating mode.

The liquid refrigerant from the receiver 10 flows through the Anti-migration solenoid valve 11A via line 112A to the heat exchanger coil of accumulator 18. The liquid refrigerant is subcooled by preferably at least 40° F. or more depending upon operating conditions and then via refrigerant line 112 enters the drier 12A and passes through to the sight glass 13 then the TX valve 14. The liquid refrigerant is metered by TX valve 14 and its pressure is reduced from 180 PSIG to about 55 PSIG. The low temp refrigerant flows via refrigerant lines 111, 108 through check valve 15, and line 110 to the distributor 16.

The refrigerant starts to evaporate in the evaporator coil 17 at low pressure where the refrigerant absorbs latent and sensible heat from the air passing through the coil. Warm air to be cooled flows as indicated at arrow A1, A2 and A3 through unit 17. The refrigerant, as superheated vapour, flows from unit 17 via refrigerant line 130 to the reversing valve 3.

The refrigerant then via refrigerant line 131 flows to the suction gas distributor temperature equalizer device 80 and into the accumulator 18 via refrigerant line 132.

The device 80, provided in accordance with another aspect of the invention, minimizes 'hunting' condition by averaging temperatures of returning gases. It retards and smooths out the rapid temperature fluctuations of the incoming gas transferring smoothed out responses to the TX valve 14 via heat responsive sensor bulb 90 then to the compressor 20.

Figure 11:
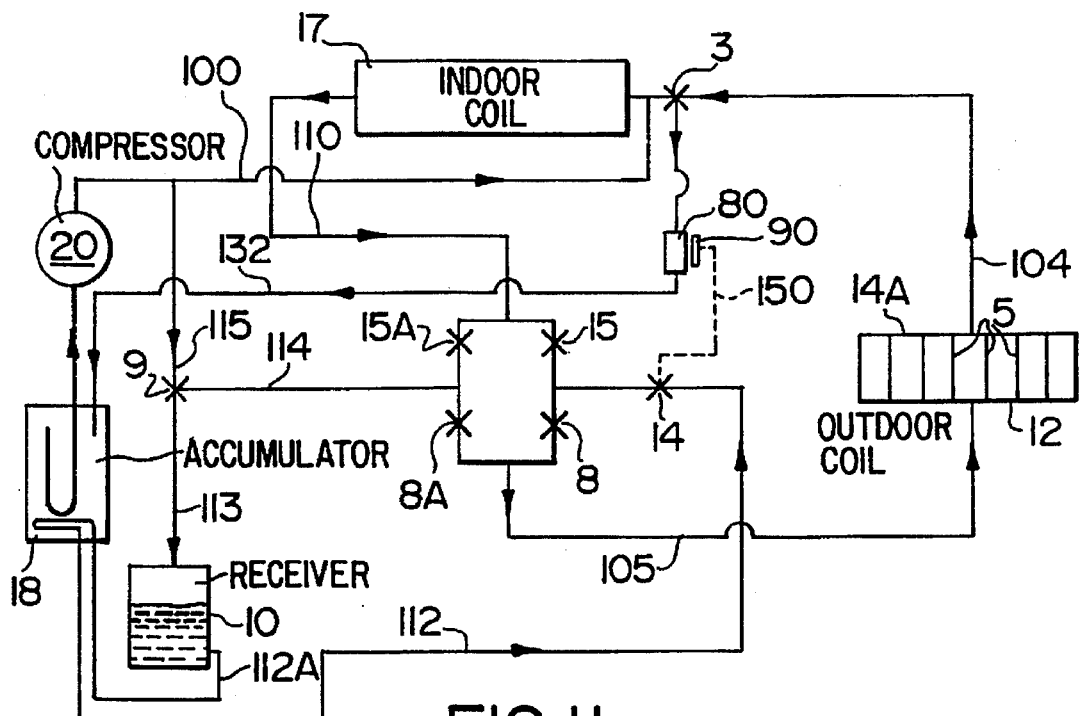
FIG. 11 is a simplified schematic illustrating refrigerant flow in the heating mode.

FIGS. 2 and 11 are schematic with arrows showing the direction of refrigerant flow in the heating mode. Referring to FIG. 2 high pressure superheated refrigerant exits the refrigerant compressor 20 as oil laden refrigerant gas via refrigerant line 100 and passes through the separator 1 where the oil is separated and returned to the compressor crankcase. The hot refrigerant gas via line 101 enters the domestic hot water coaxial refrigerant to water heat exchanger 102 of unit DHW that heats domestic hot water and desuperheats the refrigerant.

The refrigerant, via line 103, enters the reversing valve 3 which diverts the hot refrigerant gas via refrigerant line 130 to the heat pump's indoor coil unit 17 which, in the heating mode, is a condenser. The air blower or fan 21 draws air through the coil unit 17 and the hot refrigerant in the coil is condensed removing latent and sensible heat.

The refrigerant having released much of its heat to the air at the air flow through coil, then as warm high pressure liquid refrigerant flows to the receiver 10 via refrigerant lines 110, check valve 15A, line 114, head pressure valve 9 and line 113.

Excess refrigerant is stored in receiver 10 until it is used by the heat pump system when it flows through the heat exchanger of accumulator 18 remaining at high pressure and losing its excess heat to the low pressure refrigerant flowing through the suction line 120 of the accumulator. The refrigerant releases much of its remaining heat to the cool vaporized saturated refrigerant and adds needed superheat to the refrigerant entering the compressor. Further subcooling of the high pressure liquid refrigerant by approximately 40° F. which further improves its ability to absorb heat and improves the heat pump evaporators overall efficiency.

The refrigerant then flows to the thermostatic expansion valve 14 via the drier 12A and sight glass 13. The TX Valve 14 reduces the refrigerant's temperature and pressure from between 180 to 225 PSIG and 70° F. to about 55 PSIG and 30° F. The low pressure refrigerant travels through the check valve 8 to the solenoid valve S7A. The refrigerant divides into distributors 11 and 12.

The low pressure liquid refrigerant divides supplying the evaporator circuits 5A, 5B comprised each of a plurality of pipes 5 preferably with each pipe 5 in a three pipe configuration shown in FIG. 3.

With reference to FIG. 3, and in the heating mode, the refrigerant flows in the direction of arrow X in the 5/16" diameter supply line 54 branching at the "T" 56 and returning in the opposite direction as indicated by arrows Y1 and Y2 inside respective 3/8" pipes 53 and 55. The pipes buried in the ground are used as an evaporator absorbing latent and sensible heat from the soil to evaporate the refrigerant. The refrigerant then travels through the manifolds 14A, 14B, suction line 104A, check valve 30 suction lines 104B, 104 and through the reversing valve 3.

From the reversing valve the refrigerant via line 131 flows to and through suction gas distributor temperature equalizer 80 entering via line 132 the suction accumulator 18 where there is a liquid phase and gaseous phase of the refrigerant. The high pressure refrigerant going through its heat exchanger boils off the accumulated liquid low pressure refrigerant in the accumulator 18. This vapour combines with the incoming suction line vapour then enters the compressor 20 suction port where it is compressed to a high temperature and pressure.

Figure 7:
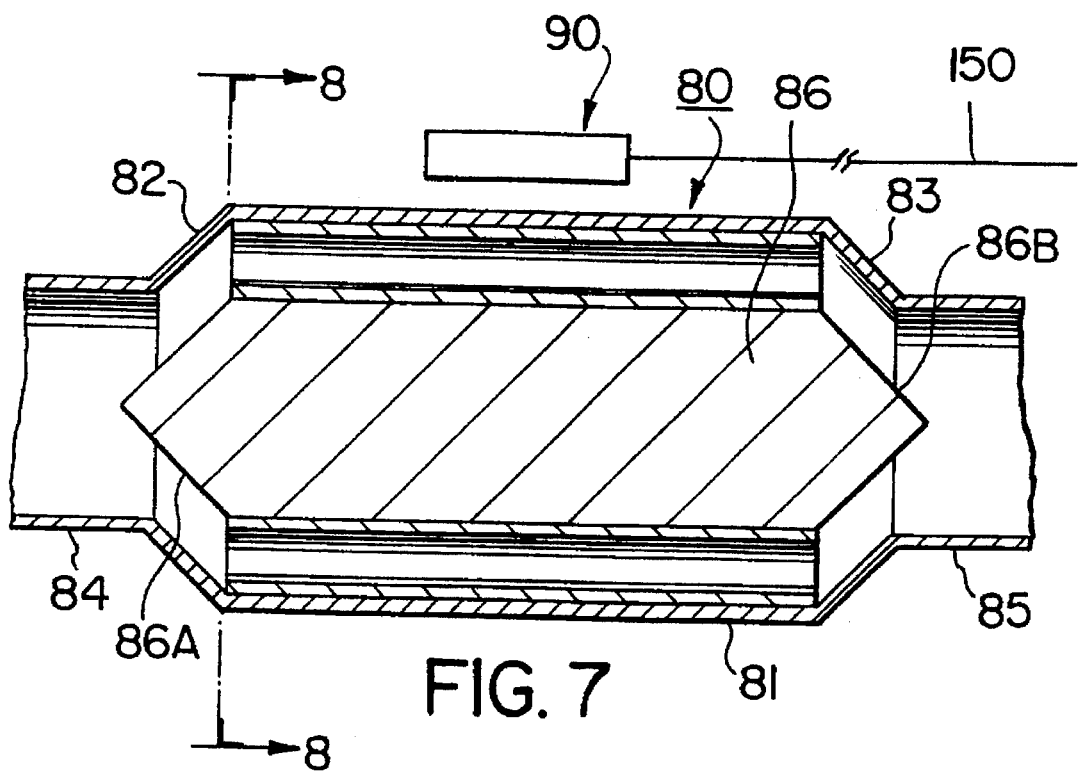
FIG. 7 is a horizontal, part sectional, view of an in-line flow through heat equalizer unit and sensor to retard activation of the expansion valve.
Figure 8:
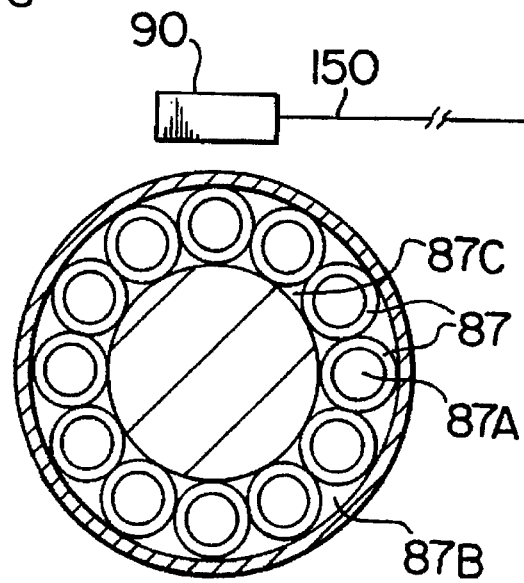
FIG. 8 is a sectional view taken along line 8—8 of FIG. 7.

The previously referred to suction gas distributor temperature equalizer 80 is shown in FIGS. 7 and 8 which are respectively longitudinal and cross-sectional views of the device. The suction gas distributor temperature equalizer 80 has a cylindrical body 81 with tapered opposite end portions 82 and 83 that provide reducers to the smaller in diameter respective opposite end connecting pipes 84, 85. Pipe 84 connects to refrigerant line 131 (see FIGS. 1 and 2) and connector pipe 85 connects to refrigerant line 132.

Within the cylindrical casing 81 there is a central core 86 surrounded by a plurality of parallel pipes or conduits 87. The conduits 87 are in tight intimate contact with the core 86, with one another and with the internal surface of the cylindrical body 81. The center core 86 has tapered opposite ends 86A and 86B. The conduits 87 provide a plurality of parallel fluid flow passages 87A and the spaces between the conduits and the outer shell 81 provide a plurality of parallel flow passages 87B. Spaces between the conduits 87 and the core 86 provide a plurality of parallel fluid flow passages 87C. All of the fluid flow passages are parallel to one another. A honeycomb type structure with thin dividing walls providing numerous parallel flow paths for the gas and heat conductive paths through the metal dividers would provide heat distribution and equalization. The object is for the device to thoroughly mix the flowing different phases of the refrigerant to maintain an evening out of the temperatures.

The enlarged central body portion 81 provides a throttling effect for gases flowing through the device and these gases flow through the passages 87A, 87B, and 87C. The heat responsive sensor 90 is disposed closely adjacent the casing 81.

The device 80 helps control hunting and improve evaporator performance by redistributing the suction gas in the suction line through all the pipes and the openings between its pipes surrounding the center core 86 which homogenizes or evenly mixes the gases and liquids returning in the suction line. In a suction line a layer of oil at the bottom of the pipe flows along sometimes with a small liquid refrigerant layer on top of the oil layer and in the remainder of the diameter of pipe superheated refrigerant vapor flows. This mixture of gases and liquids are at three different temperatures, and the TX valve bulb 90 cannot respond properly because of radical temperature changes of this pipe if the unit 80 is not used. Without unit 80 there will be "hunting" i.e. overfeed or underfeed of the liquid refrigerant in the evaporator. This can have disastrous effects to a refrigeration system—an underfeed condition will cause a compressor to overheat and seize up, an overfeed of the refrigerant in the evaporator can cause a compressor to slug or pump liquid and self destruct.

The device 80 is used in attempt to homogenize the liquids and vapors and evenly distribute both liquids and vapors through all its pipes and voids between the pipes. This device averages out the 3 different temperatures thus minimizing large temperature fluctuations. This evens out and maintains a more stable temperature at the outer shell of the device where the sensor bulb 90 is installed. The quantity of pipes and voids between the pipes not only average out the gases and liquids they average out temperature by heat transmission and exchange across all pipe walls helping vaporize the liquid refrigerant trickling across it, and also through the finned action and mass of this device heat transfer and large temperature fluctuations are slowed down and average out the temperature changes. This results in greatly improved control of the TX valve 14 and proper feed of refrigerant in the evaporator coil greatly improving the system's performance. This device is also provided with a view to protecting the compressor from overheating and prevent liquid from reaching the compressor, which if it occurs, can destroy the compressor. The device by removing erratic behaviour of the expansion valve prolongs the life of the valve by reducing excessive wear.

The device is intended for use both with long and short circuit evaporator coils but specifically for long circuit evaporator coils thermally retarding the overfeed and underfeed conditions of the TX valve, and removing the hunting conditions of the TX valve.

The three pipe configuration, i.e. pipes 53, 54, 55 of the ground coils, as shown in FIG. 3 may be in a vertical bore hole or they may be buried horizontally in the ground as illustrated in top plan view in FIGS. 5 and 6. The three pipe design, particularly in the horizontal application, reduces the refrigerant quantity in the ground coil but more importantly the three pipe configuration covers the most amount of ground with the least amount of copper tubing. This reduces installation cost while maintaining the heat pump's high efficiency.

The three pipe vertical ground coil design is primarily used where a limited amount of land is available for the ground installation or the depth of top soil to the bedrock is too shallow (less than 4 feet). Vertical drilling is done to install a vertical ground coil and preferably there are three pipes, i.e. 53, 54 and 55 in each bore hole which for example may be a three inch diameter bore hole. A system for example may use three bore holes per ton of capacity and the bore holes may be for example vertical drilled holes 50 feet in depth. The copper ground coil piping is inserted in the bore holes then the bore holes are sealed with mortar mix MX to permit proper heat transfer with the surrounding.

Figure 9:
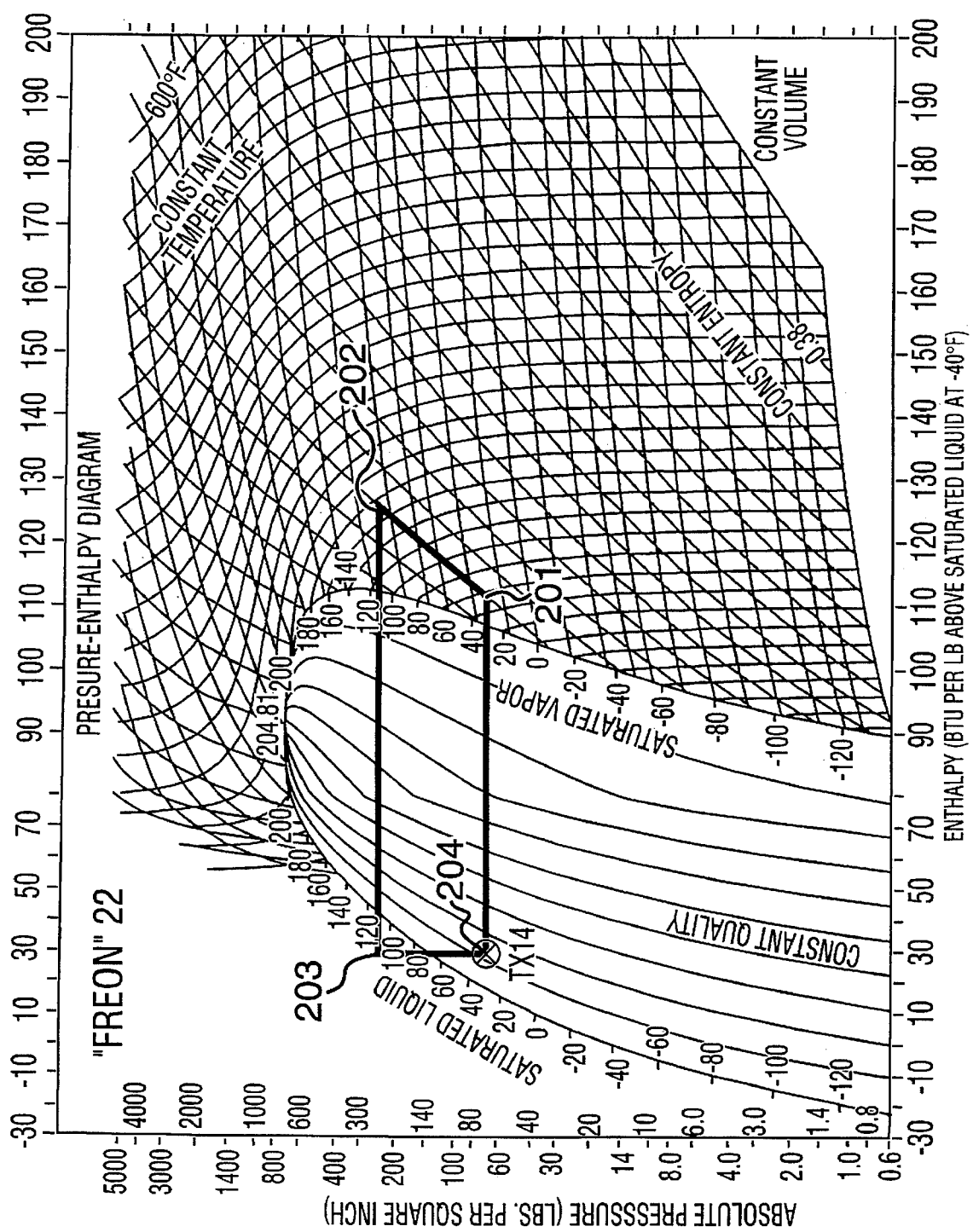
FIG. 9 is an enthalpy chart for Freon™ 22 with the present system outlined thereon.

The pressure enthalpy chart for "Freon"™ *22 is reproduced in FIG. 9 and illustrates the subcooling and benefits derived from the same. In the present heat pump system attention has been directed toward getting as much subcooling as possible at the high pressure refrigerant liquid line prior to entering the TX valve 14. High pressure liquid refrigerant, for example at 225 PSIG is metered through the TX valve 14. The valve reduces the pressure and temperature to supply the correct amount of low pressure evaporating liquid refrigerant to the evaporator.

*Trade-Mark of E. I. DuPont De Nemours & Company Inc.

With reference to FIG. 9 the line from point 201 to 202 represents compression of the gaseous refrigerant by the compressor 20. Line 103 of FIGS. 1 and 2 contains refrigerant having properties as represented at point 202. Point 201 represents the suction line conditions i.e. gaseous refrigerant in line 120. The high pressure gas enters the condenser as represented by line 202–203. Line 203–204 illustrates the refrigerant passing through the heat exchange coil in the accumulator 18 with entry to the thermal expansion valve 14 at point 204. Line 204–201 is the evaporator.

The amount of subcooling in the accumulator is represented by the dimension A in FIG. 9.

For the present system with 40° F. subcooling the enthalpy is 112 BTU–30 BTU=82 BTU/lb. and flash gas of about 12%. This compares to a conventional system of 10° F. subcooling or less of 110 BTU–40 BTU=70 BTU/lb in which there is 25% flash gas.

In a typical prior art system liquid refrigerant enters the TX valve at 225 PSIG and 100° F. and exits the TX valve at 55 PSIG, 30° F. The temperature and pressure are reduced to enable its evaporation in the evaporator coil. In this process across the TX valve as the temperature and pressure is reduced from 100° F. to 30° F. a large quantity (for example 25%) of liquid refrigerant is vaporized immediately exiting the TX valve for this vaporizing refrigerant serves to chill the remaining 75% from 100° F. to 30° F. so that this refrigerant can enter the evaporator coil to further absorb heat completely evaporating itself to a vapour. The drawback of this typical system is that 25% of the refrigerant is circulated through the evaporator unnecessarily and this causes 25% less room in the evaporator piping for useful low pressure liquid refrigerant to absorb heat. This also causes the compressor to unnecessarily have to circulate 25% of the refrigerant and renders the refrigerant system 25% less efficient. For example the refrigerant can only absorb about 60 BTU of heat per pound circulated through the evaporator.

In the present system with 40° F. of subcooling, the evaporator and refrigeration system are improved, by possibly as much as 16%, because the amount of useless flash gas exiting the TX valve is reduced say to about 9%. This improves the system's evaporators and compressors capacity by for example about 16% over conventional systems. This increases the amount of heat that each pound of refrigerant can absorb in the evaporator for example up to 84 BTU—per pound which in a conventional system is about 60 BTU—per pound. With a net improvement (of say 24 BTU per pound of refrigerant circulated in the evaporator coil) the evaporator's efficiency increases by for example as much as 16% and a resultant total system efficiency increases for example by as much as 16%. The resulting increase in efficiency of the present system reduces greatly the overall heating and cooling cost of homes or buildings, and also permits the use of a smaller compressor.

Summary of Design Characteristics

The following is a list of principle components used in the present system and a summary of their particular function in the design.

The head pressure control valve 9 preferred is available from Sporlan Valve Co. under their designation OROA™. It has a setting of 180 PSIG for refrigerant R22. This valve responds to pressure only and opens on pressure rise. One reason for using this valve is for acquiring heat rapidly in the indoor coil 17 in the heating mode. Primarily, however, in the cooling mode it is used to backflood the ground coil to artificially raise its pressure to 180 PSIG to permit refrigerant flow out of the ground coil. Also, as this valve controls coil pressures it also controls the pressure of receiver 10 to 180 PSIG.

The Adjustable Head Pressure Control Valve 9A. Normally in a conventional system this is used in the manner of the valve 9 but not in the present system. In the present system valve 9A is used as a shutoff and pressure relief valve switching at about 225 PSIG. This valve is used in conjunction with 2 check valves (7,30) and functions in the cooling mode to shut off ⅔ of the ground coil to triple the Delta "T" i.e. temperature difference of the ground coil and the earth in conjunction with the backflooding of the head pressure control valve 9. In addition to backflooding it also thermally raises the temperature and pressure of only ⅓ of the ground coil to a minimum of 180 PSIG and up to 225 PSIG where the adjustable head pressure control valve 9A starts dumping high pressure hot refrigerant into the remaining ⅔ of the ground coil that has so far remained inactive. Slowly this valve relieves the pressure and refrigerant vapour into the rest of the ground coil and controlling pressure to about 225 PSIG. This bypassing refrigerant condenses in the remainder of the ground coil in conjunction with the original ⅓ of the ground coil. The condensed refrigerant travels through check valves 7,8A returning to the receiver 10. While herein there is specifically disclosed effectively a two stage condenser it is to be understood there could be multiple stages that would be brought into use in sequence. Also the pipes of group 5A and the pipes of Group 5B could be overlapping in heat transfer area so that heat from the 5A group would start thawing of the earth around pipes in the Group 5B before the latter are brought on stream.

Check valve 30 on the ground coil permits suction gas to exit from the ⅔ of the ground coil in the heating mode i.e. section 5B. In cooling mode it prevents high pressure hot gas from entering that ⅔'s of the ground coil Check valve 7 prevents low pressure refrigerant from entering the ⅔ of the ground coil i.e. section 5B. The refrigerant must flow through the solenoid valve S7A that is only open in the heating mode. Check valve 7 only opens in the cooling mode when the ⅔ part of the ground coil i.e. section 5B becomes active.

Solenoid valve 11A is downstream of the receiver 10 and ahead of the TX Valve 14. This is used as a pump down valve in the heating mode and a shut off valve and antimigration valve in the heating mode. Because the TX valve 14 has a 15% constant bleed on off cycle the refrigerant has a tendency to flow to the ground coil and cause start up problems to the heat pump and possibly slugging (i.e. return of liquid refrigerant to the compressor).

A high torque compressor 20 is used, for example a scroll compressor, because of the high torque starting ability. In the present system the high and low side never equalize in pressure and therefore the compressor must be able to start under high pressure conditions.

Reversing Valve 3 is used to reverse refrigerant from one to the other of the heating to cooling modes.

Check valves 8, 8A, 15 and 15A assist the reversing valve in switching the system from one to the other of heating and cooling modes. They permit the flow of refrigerant from the condenser to always be in one direction. They permit the use of only one TX valve 14 thus providing system simplicity and permit subcooling through the accumulator heat exchanger. Subcooling the refrigerant by about 40° F. greatly improves the performance.

Accumulator 18 with Heat Exchanger. This accumulator traps and separates any liquid refrigerant out of the incoming vapour to the compressor. Also, uses the heat from the refrigerant flowing across its heat exchanger to vaporize the liquid refrigerant at its bottom so that only refrigerant in vapour form is allowed to enter the compressor so as not to damage the compressor. Also the subcooled liquid refrigerant exiting its heat exchanger contributes to improving the systems performance.

Receiver 10. This is a storage tank for refrigerant. This tank is there as a reservoir to store more or less refrigerant as the systems conditions and temperatures change and is there to accommodate the pump down cycle to store the pumped down refrigerant.

The thermal expansion balanced port valve with 15% bleed continually adjusts itself to various load conditions of the system and the continuous 15% bleed assists in preventing hunting.

The three pipe ground coil previously described is preferred as it keeps the quantity of refrigerant to a minimum and covers as much ground as possible.

Oil separator 1 is for the purpose of ensuring that a minimal amount of oil travels through the ground coil and thereby improving the performance of the ground coil and to ensure that the compressor doesn't run out of oil.

Suction Gas Distributor and Temperature Equalizer 80. This minimizes the "hunting" condition. It is used to control hunting and to average the temperature of the returning gas. It retards and smooths out the rapid temperature fluctuations of the incoming gas transferring smoothed out responses to the heat sensor bulb 90 controlling the TX valve 14.

The present heat pump preferably utilizes the three pipe heat exchanger design that consists of a center liquid line and 2 larger outer pipes. In the heating cycle the small pipe (54) is the liquid refrigerant supply line and the 2 larger pipes (53, 55) act as return evaporator pipes. This heat pump uses a quantity of these coil configurations to suit the size of the heat pump and to cover a calculated area of soil. In the cooling mode this piping configuration reverses its flow where the 2 large outer pipes (53, 55) are used as the condenser coil and the smaller middle pipe (54) becomes a liquid return condensate refrigerant line.

In conjunction with this reversal in flow, there is a pump out of ⅔ of the rest of the ground coil pipes and refrigerant backflooding only in ⅓ of the ground coil. Closing of the solenoid valve S7A in conjunction with check valve 30 and the head pressure control valve 9A keeps the ground coil section 5B closed from the system until the pressure reaches about 225 PSIG.

This method will only use and backflood ⅓ of the condenser coil therefore greatly reducing the condenser refrigerant charge in the cooling mode. In the cooling mode the heat pump is rejecting heat to the soil—defrosting the soil and also heating it to a temperature where the refrigerant pressure will start to rise towards 225 PSIG. After a period of time when this pressure is reached the soil is then warmed up and the condenser pressure will start to exceed 225 PSIG. This will cause the head pressure control valve 9A to start opening thereby sending hot refrigerant vapour to the rest of the ground coil and in effect reducing the overall ground coil Delta "T" from about 30° temperature difference to about 10° temperature difference therefore using the complete ground coil as a condenser in the cooling mode. This permits (1) a gradual defrosting of the soil (2) a firm control of the condenser pressure and temperature (3) a smaller quantity of refrigerant in cooling mode to the extent that the same amount of refrigerant is used in each of the cooling and heating modes and (4) this method also permits the full use of the ground coil as a condenser in a controlled manner to maintain temperature and pressure and will prevent excessive refrigerant pressure and temperature in the ground coil.

As the refrigerant condenses in the remainder of the ground coil it permits its pressure not to exceed 225 PSIG and returns to the heat pumps receiver through check valves 7, 8. Delta "T" or temperature difference is the difference between the refrigerant temperature and the medium it absorbs or rejects heat to; EX: in air fan coil 17 in the cooling mode the refrigerant is approx 30° F. colder in the finned coil than the surrounding air entering across this coil (this permits the heat from the air to enter or be absorbed by the colder refrigerant). In heating mode the refrigerant in the air coil 17 is 20° F. warmer than the incoming air across it—this permits the heat energy from the refrigerant to be absorbed by the air therefore; heating the air. In the ground coil the ground coil is larger so that in the heating mode this coil is an evaporator at 10° F. temperature difference between the refrigerant and the coil. In the cooling mode the ground coil becomes a condenser rejecting heat to the ground at approx 30° F. temperature difference.

The present heat pump design has addressed the various problems associated with known DX (direct expansion) heat pump systems. The 'hunting' problem is reduced by applicant's preferring ground loop design and its operation.

Subcooling of the liquid refrigerant for example by 40° F. in the accumulator reduces the mass flow of refrigerant in the ground coil. The reduced mass flow in the ground coil with increased subcooling of the liquid line reduces the amount of flash gas exiting the TX valve (perhaps by as much as 10–15%), improving the ability of the refrigerant to absorb more "BTU" or heat from the earth.

The reduced mass flow of refrigerant results in increased system capacity because the compressor has to pump less refrigerant per minute therefore greatly improving the system's capacity and improving the ground coils capacity (perhaps by as much as 15% or more).

The present system utilizes a balanced port expansion valve 14 with a 15% bleed ratio. The selection of this particular valve is also to control hunting. The balanced port section of this valve is designed to self adjust itself to the constant fluctuations of flow and capacities of this system. The 15% bleed of this valve also controls the hunting of the system which is a 15% constant flow of refrigerant to smooth out the constant re-adjusting function of the balanced port TX valve 14.

The suction gas distributor and temperature equalizer 80 in the system works in conjunction with the balanced port valve to stop hunting. This device 80 homogenizes the incoming refrigerant vapour from the ground collector coil. This refrigerant is saturated, partly superheated and entrains a trace of liquid refrigerant and refrigeration oil at the bottom of the return suction pipe. The refrigerant TX valve sensing bulb 90 is attached to device 80. Device 80 retards heat transfer to the bulb 90, homogenizes the refrigerant by flowing through the multiple fluid flow passes; the returning refrigerant being vapour, liquid and refrigeration oil. The 3 different temperatures of these three different phases are averaged out and thermally slows the rapid temperature changes of the returning gases. Small and averaged temperature fluctuations are transmitted to the bulb 90.

To control and reduce the refrigerant charge and to still cover as much ground area there is provided what is referred to herein as a "three pipe" ground coil. The ground coil consists of a plurality of "three pipe" units each consisting of one supply line and 2 return lines these being parallel and co-extensive and with the supply line connected. Also at one end to an adjacent end of each of the return lines the ground coils are separated into groups with suitable controls so that a selected group (or groups) can be kept off stream until certain predetermined conditions have been met.

To keep the refrigerant charge to a minimum and to assure proper refrigerant flow and pressure of the heat pump in cooling mode 2 different valves are used. One is a "Sporlan" OROA™ valve (head and receiver pressure control valve 9), and the other an adjustable head pressure control valve 9A. Valve 9 will control and maintain the condenser pressure and the receiver pressure. It is important to maintain a pressure of no less than 180 PSIG in the condensers in whatever mode the heat pump is in. In the heating mode this valve will backflood the air coil with refrigerant assuring 180 PSIG and rapidly producing heat soon after the heat pump cycles in the heating mode. In the cooling mode this valve will backflood the ground coil that rejects heat in this mode; the pressure will rise to 180 PSIG and up in this coil assuring proper refrigerant flow.

In order to further reduce the refrigerant charge, and also to maintain the same refrigerant charge in the heat pump in cooling and heating modes, a head pressure control valve 9A is used to make use of ⅓ of the ground coil in cooling mode tripling the Delta "T" of the ground coils, reducing charge and increasing its temperature at the same time the OROA™ valve 9 backfloods this ⅓ of the ground coil assuring 180 PSIG. After a period of time the soil warms up and the ground coil pressures reach 225 PSIG. This is where the head pressure control valve 9A starts to divert some of the condensers hot gas to the remainder ⅔ of the ground coils. This method of utilizing the ground coil as a condenser keeps the systems charge of refrigerant to a minimum and permits proper pressure and flow of the refrigerant.

FIGS. 10 and 11 are simplified schematics with arrows indicating the direction of refrigerant flow and pressures in the different sections for the respective cooling and heating modes. These figures also illustrate a single section ground coil as opposed to the two section ground coil of FIGS. 1 and 2. With reference to the check valves 8, 8A, 15, 15A they are designed to operate as follows.

Operations of Check Valves—Cooling Mode

In the cooling mode the evaporator coil 17 becomes 55 PSIG lowering the pressure in line 110 and permits the flow of low pressure refrigerant from the TX valve 14 through check valve 15 and proceeding through line 110 and distributor 16 and evaporator 17.

Check valve 8 is blocked by high pressure refrigerant in liquid state at no less than 180 PSIG from the ground condenser coil. This condensed high pressure liquid refrigerant travels through check valve 8A then through line 114 to receiver 10. Check valve 15A is maintained shut by the high pressure liquid refrigerant 180 PSIG the other side of this check valve 15A being at 55 PSIG is held shut by the refrigerant pressure on its opposite side at 180 PSIG.

Operations of Check Valves—Heating Mode

In heating mode the ground coil becomes 55 PSIG and this reduction in pressure permits low pressure refrigerant to flow out of the TX valve 14 through the check valve 8 to lines 105 and 105A to ground evaporator coil 5 and the high pressure liquid refrigerant from the condenser 17 coil at 180 PSIG holds check valve 15 & 8A closed. The high pressure liquid refrigerant from the condenser 17 flows through line 114 to receiver 10. Check valve 15 is held shut by the high pressure 180 PSIG liquid refrigerant from the condenser because the opposite side of check valves 8A and 15 is only at 55 PSIG.

To summarize the valve operation valves 15A and 8 are open in the heating mode and closed in the cooling mode and valves 15 and 8 are closed in the heating mode and open in the cooling mode. These valves are spring loaded and flow through is from the differential pressure. The refrigerant line between these valves is low pressure. The ground coil is high pressure during the cooling mode and low pressure in the heating mode. The evaporator 17 is low pressure in the cooling mode and high pressure in the heating mode. The low pressure of 55 PSIG referred to hereinbefore is considered the average normal operating pressure but variations will occur. In the heating mode the pressure may be in the range of 45 PSIG to 70 PSIG while in the cooling mode the range might be 55 PSIG to 70 PSIG. The high pressure side in the cooling mode in early spring may be 180 PSIG rising gradually later in the season to 225 PSIG. In the heating mode the condenser pressure may be in the range of 180 PSIG to 230 PSIG.

I claim:

1. In a ground source heat pump system having a refrigerant compressor with high torque starting characteristics, a closed loop refrigerant circuit including a reversing valve, an indoor coil and an outdoor coil the improvement comprising a divided outdoor coil having at least two parallel flow sections and including a head pressure control valve operatively controlling flow of the refrigerant, in the cooling mode, to a selected one of said sections, said control valve being normally closed preventing flow of refrigerant to said one section until such time as the refrigerant reaches a predetermined pressure and first check valve means in parallel with said head pressure control valve means permitting free flow of refrigerant in the opposite direction during operation in the heating mode.

2. The improvement as defined in claim 1 wherein said coil sections each have an outlet, means interconnecting said outlets of said coil sections, second check valve means preventing refrigerant flow through said outlets of said one coil section, into said one coil section and a solenoid controlled valve means in parallel with said second check valve means.

3. The improvement as defined in claim 1 wherein said outdoor coil sections each comprise a plurality of pipes in the ground and in parallel fluid flow relation.

4. The improvement as defined in claim 3 wherein each of said plurality of pipes comprises three substantially co-extensive pipes with one of the three being connected at one end thereof to each of the other two at said one end.

5. The improvement as defined in claim 4 wherein pipes are disposed in vertical bore holes in the ground and wherein each bore hole contains three of said co-extensive interconnected pipes.

6. In a ground source heat pump system having a refrigerant compressor with high torque starting characteristics, a closed loop refrigerant circuit including a reversing valve, an indoor coil and an outdoor coil the improvement comprising a divided outdoor coil having at least two parallel flow sections and including a head pressure control valve operatively controlling flow of the refrigerant, in the cooling mode, to one of said sections, said control valve being normally closed preventing flow of refrigerant to said one section until such time as the refrigerant reaches a predetermined pressure and wherein, in the heating mode, the indoor coil is the condenser coil, said system including a refrigerant accumulator, means connecting said accumulator to the intake of said compressor and including a suction gas distributor and heat equalizer in a refrigerant line from said condenser to said accumulator, said distributor and equalizer comprising an enlargement through which the refrigerant passes and a plurality of parallel discrete fluid flow paths located in said enlargement.

7. The improvement as defined in claim 6 wherein said enlargement comprises an elongate casing and including a plurality of elongate conduits disposed therein providing said discrete parallel fluid flow paths.

8. The improvement as defined in claim 7 including an elongate body defining a core within said enlargement, and wherein said conduits are in intimate contact with said core and an inner surface of a wall defining said elongate casing.

9. A direct expansion ground source heat pump system comprising:

(a) a compressor (20) having high torque starting characteristics;

(b) a reversing valve (3) for switching the system from one to the other of a heating mode and a cooling mode;

(c) a ground coil system that includes a first group (5A) of a plurality of parallel fluid flow through pipes (5) located in the earth and to which the refrigerant flows to from said compressor when said reversing valve is in its cooling mode position;

(d) a second group (5B) of a plurality of fluid flow through pipes (5) located in the earth, said second group (5B) being in parallel flow with said first group;

(e) a head pressure regulator valve (9A) preventing flow of refrigerant to said second group until such time as such refrigerant reaches a predetermined pressure;

(f) a refrigerant receiver tank;

(g) a pressure regulator valve (9) in a return line for refrigerant in the cooling mode operation from the ground coil to said refrigerant receiver tank (10);

(h) a thermal expansion valve (14);

(i) a heat exchanger refrigerant accumulator tank (18) having a heat exchanger coil therein in a refrigerant flow through line from said receiver tank (10) to said thermal expansion valve (14);

(j) an indoor air flow through heat exchanger coil between said thermal expansion valve (14) and said accumulator tank (18); and (k) a refrigerant line extending from within said accumulator tank (18) to said compressor, said line within the tank being in heat exchange relation with said heat exchanger coil of paragraph (i).

10. A direct expansion ground source heat pump system comprising:

(a) a compressor having an output side of high pressure gaseous refrigerant and a suction input side, said compressor having high starting torque characteristics;

(b) an indoor heat exchanger coil providing an evaporator and condenser respectively in a cooling and heating mode of operation for the system;

(c) an outdoor sub-surface heat exchanger coil providing a condenser and evaporator respectively in said cooling and heating mode of operation;

(d) a receiver tank for holding a supply of liquid refrigerant including means to return refrigerant thereto from a selected one of said coils dependent upon the selected mode of operation for the system;

(e) a reversing valve;

(f) an accumulator and means operatively connecting said accumulator to said suction side of the compressor for supplying refrigerant thereto in a gaseous state and to said reversing valve for return of refrigerant from a selected one of said coils dependent upon the selected heating or cooling mode of operation determined by the selected position for said reversing valve;

(g) a flow through pressure control valve operatively connected to said receiver tank and return of refrigerant from a selected one of said indoor and outdoor coils dependent upon the selected heating or cooling mode of operation; and (h) a thermal expansion valve operatively connected to said receiver tank and selectively to one of said outdoor and indoor coils dependent upon the selected mode of operation with the connection being to a supply side of the outdoor coil in the heating mode of operation and the supply side to said indoor coil in the cooling mode of operation.

11. A heat pump system as defined in claim 10 including a first heat exchanger coil within said accumulator and wherein said first heat exchanger is disposed in series in said operative connection of said thermal expansion valve to said receiver tank.

12. A heat pump system as defined in claim 10 including valve means controlling flow with respect to said indoor and outdoor coils, said receiver tank and said thermal expansion valve such that refrigerant flows in the same direction through the latter in each of the cooling and heating modes of the system.

13. A heat pump system as defined in claim 10 including valve means directing refrigerant flow in the system through said indoor and outdoor coils in a first direction with the system operating in its cooling mode and in a second direction opposite said first direction when the system is operating in its heating mode.

14. A heat pump system as defined in claim 13 wherein said outdoor subsurface coil comprises a plurality of pipe units and first and second header means located respectively at opposite ends of flow paths through the respective units connecting said pipe units in parallel flow relation.

15. A heat pump system as defined in claim 14 wherein each said pipe unit includes three substantially co-extensive pipes, means interconnecting said pipes providing parallel flow in one direction through two of said pipes in series with flow in the opposite direction through the remaining one of said three pipes and means connecting said two of the pipes of each pipe unit to said first header and means connecting said remaining one of the three pipes of each pipe unit to said second header.

16. A heat pump system as defined in claim 15 wherein said first header comprises first and second non-communicating header sections, a first group of said pipe units being connected to said first header section and a second remaining group of said pipe units being connected to said second header section, means operatively connecting said reversing valve to each of said first and second header sections and valve means providing free flow of refrigerant from each of said first and second header sections to said reversing valve for the heating mode operation of the system and preventing refrigerant flow to said second header section in the cooling mode of operation of the system until such time as the pressure of the refrigerant in said second header section reaches a predetermined level.

17. A heat pump system as defined in claim 10 including valve means operative in the cooling mode operation of the system dividing said outdoor coil into first and second parallel flow sections, said valve means preventing flow of refrigerant to said second section from said reversing valve until such time as the refrigerant has reached a predetermined pressure.

18. A heat pump system as defined in claim 17 wherein the refrigerant is R22 and wherein said predetermined pressure is approximately 225 psi.

19. A heat pump system as defined in claim 10 including a refrigerant flow through suction gas distributor and heat equalizer device located between the condenser in the heating mode and said accumulator, means providing an output signal responsive to the temperature of said device for activating said thermal expansion valve.

20. A heat pump system as defined in claim 19 wherein said distributor and equalizer device comprises an enlargement through which the refrigerant passes and a plurality of parallel discrete fluid flow paths surrounding said core, said flow passages located in said enlargement.

21. A heat pump system as defined in claim 20 wherein said enlargement comprises an elongate casing, and including a plurality of elongate conduits disposed therein.

22. A heat pump system as defined in claim 21 including an elongate body defining a core within said enlargement, and wherein said conduits are in intimate contact with said core and an inner surface of a wall defining said elongate casing.

23. A heat pump system as defined in claim 12, wherein said outdoor subsurface coil comprises a plurality of pipe units and first and second header means located respectively at opposite ends of flow paths through the respective units connecting said pipe units in parallel flow relation and wherein each said pipe unit includes three substantially co-extensive pipes, means interconnecting said pipes providing parallel flow in one direction through two of said pipes in series with flow in the opposite direction through the remaining one of said three pipes and means connecting said two of the pipes of each pipe unit to said first header and means connecting said remaining one of the three pipes of each pipe unit to said second header.

24. A heat pump system comprising an indoor unit that includes operatively connected in a system a scroll compressor, a pressure control valve, a refrigerant receiver tank, an accumulator with a heat exchanger coil therein, a thermal expansion valve, directional flow control valve means, an indoor coil, an outdoor coil unit comprising a plurality of heat exchanger pipes for subsurface use and means including valve means for connecting said outdoor coil unit to said indoor unit, said heat pump system in its cooling mode of operation having a refrigerant flow path of hot compressed refrigerant from said compressor to and through said reversing valve to said outdoor coil unit, through said outdoor coil unit, through said pressure control valve to said receiver tank, from said receiver tank through the heat exchanger in said accumulator to and through said indoor coil, to said accumulator and from said accumulator to the suction side of said compressor and signal generating means responsive to the temperature of the refrigerant being returned to the accumulator for actuating said thermal expansion valve, said system in the heating mode of operation as determined by the setting of said reversing valve having a refrigerant flow path from said compressor to said reversing valve to said indoor coil where the flow therethrough is in a direction opposite to the flow when in the cooling mode, from said indoor coil through said pressure control valve to said receiver tank, from the receiver tank through the heat exchanger coil in said accumulator to said thermal expansion valve, from said expansion valve through said ground coil in which the fluid flow direction is opposite to that when in the cooling mode, from said outdoor coil to said accumulator via said reversing valve.

25. A heat pump system as defined in claim 24 including a line from the high pressure side of said compressor through said pressure control valve for supplying as required high pressure refrigerant to said receiver tank to maintain the receiver at a selected pressure.

26. A heat pump system as defined in claim 25 including means dividing said ground coil pipes into a first group of a plurality of pipes and a second group of a plurality of pipes and pressure relief valve means preventing refrigerant flow into said second group until such time as the refrigerant pressure has reached a predetermined level.

27. A heat pump system as defined in claim 26 wherein said second group comprises approximately two thirds of the total number of pipes.

28. A heat pump system as defined in claim 27 wherein said pipes each comprises a three pipe system that includes two pipes providing parallel flow paths and a third pipe connected thereto providing a third path in series therewith.

29. A heat pump system as defined in claim 28 wherein refrigerant flow in said third pipe is in a direction opposite to that in said two pipes.

30. A heat pump system as defined in claim 29 wherein the flow through said pipes in the cooling mode is opposite to that when in the heating mode.

31. A heat pump system using a heat exchanging fluid existing in gaseous and liquid form comprising:
   a compressor with high torque starting characteristics for compressing said heat exchanging fluid;
   a reversing valve functionally connected to said compressor for selectively directing the flow of said heat exchanging fluid from said compressor;
   an indoor heat exchange coil for transferring heat to or from the interior of a building functionally connected to said reversing valve;
   an accumulator for trapping and storing liquids within the apparatus functionally connected to said reversing valve;
   a sub-surface heat exchanger comprising a plurality of heat exchanger tubes connected in parallel fluid flow and functionally connected to said reversing valve;
   a pressure flow control valve;
   a refrigerant receiver tank functionally connected through said pressure flow control valve to an outflow side respectively of said indoor coil and sub-surface heat exchanger tubes dependent upon the selected mode of operation; and
   a thermal expansion valve functionally connected to an outflow side of said receiver tank and to an inflow side respectively of said indoor and sub-surface exchangers dependent upon the mode of operation.

32. A direct expansion ground source heat pump system comprising an indoor coil functioning as a condenser in the heating mode, an outdoor sub-earth coil functioning as an evaporator in the heating mode, an accumulator receiving refrigerant from an outflow side of the outdoor coil through a first refrigerant line, a compressor with high starting torque characteristics with a suction side connected to said accumulator and an outlet connected to said indoor coil, a receiver tank for said refrigerant, a second refrigerant line from the outflow side of said condenser to an inflow side of said receiver tank, a pressure flow control valve in said second refrigerant line for maintaining a selected operating pressure of the refrigerant in the system, a third refrigerant line from an outflow side of said receiver tank to an inflow side of said evaporator coil, a thermal expansion valve in said third line and heat sensing means providing an output signal in response to the temperature of the refrigerant returning from said outdoor coil to said accumulator, said thermal expansion valve being responsive to said signal.

33. A direct expansion ground source heat pump comprising an indoor coil, an outdoor coil, an accumulator, a receiver tank, a compressor having high starting torque characteristics, a reversing valve, a thermal expansion valve and refrigerant lines with valve means operatively interconnecting said components whereby in the cooling and heating modes, as determined by the setting of the reversing valve, the outdoor coil in the cooling and heating mode is respectively a condenser and an evaporator and the indoor coil respectively an evaporator and a condenser, the refrigerant in the condenser being high pressure and in the evaporator low pressure, and wherein, in each mode, said receiver is on the high pressure side with refrigerant flowing unidirectionally to and through said expansion valve and wherein the refrigerant on the suction side of the compressor, passes through a heat equalizer and refrigerant distributor into said accumulator and from said accumulator to said suction side and including heat sensing means associated with said heat equalizer providing a signal to control said thermal expansion valve.

34. A direct expansion ground source heat pump comprising an indoor coil, an outdoor coil, an accumulator, a receiver tank, a compressor having high starting torque characteristics, a reversing valve, a thermal expansion valve and refrigerant lines with valve means operatively interconnecting said components whereby in the cooling and heating modes, as determined by the setting of the reversing valve, the outdoor coil in the cooling and heating mode is respectively a condenser and an evaporator and the indoor coil respectively an evaporator and a condenser, the refrigerant in the condenser being high pressure and in the evaporator low pressure, and wherein, in each mode, said receiver is on the high pressure side with refrigerant flowing unidirectionally to and through said expansion valve, wherein said outdoor coil being subterranean and including a first flow through section and at least one further flow through section in parallel with said first section, head pressure control valve means operatively preventing refrigerant flow in a first direction through said further section in commencement of a cooling mode operation until such time as the refrigerant to said further section has reached a predetermined pressure and check valve means in parallel with said head pressure control valve means permitting free flow of refrigerant in a direction opposite said one direction during a heating mode operation.

35. The system as defined in claim 33 in which essentially the same amount of refrigerant is required in each of the heating and cooling modes of operation.

* * * * *